US008681112B2

(12) United States Patent
Singhal

(10) Patent No.: US 8,681,112 B2
(45) Date of Patent: Mar. 25, 2014

(54) APPARATUS AND METHOD FOR TOUCH SCREEN USER INTERFACE FOR ELECTRONIC DEVICES PART IC

(76) Inventor: Tara Chand Singhal, Torrance, CA (US)

(*) Notice: Subject to any disclaimer, the term of this patent is extended or adjusted under 35 U.S.C. 154(b) by 238 days.

(21) Appl. No.: 13/065,078

(22) Filed: Mar. 14, 2011

(65) Prior Publication Data

US 2011/0163989 A1 Jul. 7, 2011

Related U.S. Application Data

(63) Continuation of application No. 12/454,345, filed on May 15, 2009.

(51) Int. Cl.
    *G06F 3/041* (2006.01)

(52) U.S. Cl.
    CPC ........ *G03F 3/04883* (2013.01); *G03F 3/04886* (2013.01); *G03F 2203/04809* (2013.01)
    USPC .......................................... 345/173; 345/178

(58) Field of Classification Search
    CPC ............ G06F 3/04883; G06F 3/04886; G06F 2203/04809
    USPC ................. 345/156–184, 660; 455/566, 418; 382/203; 715/781, 656; 361/56, 679
    See application file for complete search history.

(56) References Cited

U.S. PATENT DOCUMENTS

| | | | |
|---|---|---|---|
| 6,346,935 B1 * | 2/2002 | Nakajima et al. | 345/173 |
| 8,264,471 B2 * | 9/2012 | Martensson | 345/173 |
| 8,522,153 B2 * | 8/2013 | Feldman et al. | 715/754 |
| 2004/0140959 A1 * | 7/2004 | Matsumura et al. | 345/173 |
| 2004/0239763 A1 * | 12/2004 | Notea et al. | 348/169 |
| 2007/0057922 A1 * | 3/2007 | Schultz et al. | 345/173 |
| 2007/0085840 A1 * | 4/2007 | Asaka et al. | 345/173 |
| 2008/0018615 A1 * | 1/2008 | Zadesky et al. | 345/173 |
| 2008/0074439 A1 * | 3/2008 | Parenteau et al. | 345/630 |
| 2008/0109729 A1 * | 5/2008 | Notea et al. | 715/722 |
| 2009/0102805 A1 * | 4/2009 | Meijer et al. | 345/173 |
| 2009/0262072 A1 * | 10/2009 | Chen | 345/157 |
| 2010/0023251 A1 * | 1/2010 | Gale et al. | 701/201 |
| 2010/0045608 A1 * | 2/2010 | Lessing | 345/173 |
| 2010/0194701 A1 * | 8/2010 | Hill | 345/173 |
| 2012/0287072 A1 * | 11/2012 | Pryor | 345/173 |

* cited by examiner

*Primary Examiner* — Prabodh M Dharia
(74) *Attorney, Agent, or Firm* — Stever Roeder, Esq.

(57) ABSTRACT

A user interface in handheld devices has a touch screen for generating control signals for control of an electronic device, with a continuous touch movement detection on the touch area from a single touch from a begin sub-area to an end sub-area via a middle sub-area, in the touch control logic of the touch screen. The continuous touch movement detection in the logic memory creates substantially an arc touch movement from the begin sub-area to the end sub-area. The arc touch movement in the touch control logic of the touch screen is used to generate a control command signal for the electronic device. The touch movement detections, clockwise or anticlockwise, convex or concave are used to generate different control signals for the device and thus provide a large number of navigation control functions.

20 Claims, 7 Drawing Sheets

At step 80, bounding a control surface that is oversized to a thumb tip and partitioning the area into a center area and four surrounding areas.

At step 82, positioning a thumb tip in the center area and sliding on the control surface in any one of four directions causing a corresponding movement of a curser on the display screen, and sliding the thumb tip back to the center area to stop the cursor movement.

At step 84, tapping the center area to activate a function that is highlighted by the curser.

At step 86, partitioning the control surface into additionally four corner areas;

At step 88, positioning a thumb tip in the center area and sliding on the control surface in any one of four corner directions causing a corresponding movement of a curser on the display screen, and sliding the thumb tip back to the center area to stop the cursor movement.

At step 90, using the eight areas around the center area, creating a set of movements from a group of (i) up/down, left/right for scroll function (ii) from a right area to a top area and vice versa for an arc movement, (iii) from a top area to a bottom area around the center area, for a semi-circle movement and vice versa.

Figure 6

APPARATUS AND METHOD FOR TOUCH SCREEN USER INTERFACE FOR ELECTRONIC DEVICES PART IC

CROSS REFERENCE

This application is a continuation of U.S. patent application Ser. No. 12/454,345, filed May 15, 2009, titled "Apparatus and method for touch screen user interface for handheld electronic devices part I" of Tara Chand Singhal.

This application is related to and claims priority from U.S. patent application Ser. No. 12/456,009, filed Jun. 10, 2009, titled "Apparatus and method for touch screen user interface for handheld electronic devices part II" of Tara Chand Singhal.

FIELD OF THE INVENTION

The embodiments described herein are for touch screen user interface navigation and control for handheld electronic devices, such as remote controls, music devices, gaming devices, personal digital assistants and cell phones.

BACKGROUND

Touch screen control technology has been in use for many years in applications such as ATM and airport check-in kiosks among similar other applications. The touch sensitive technology has also been used in laptops for cursor control for many years.

Recently, the touch screen control technology is being widely adapted in hand held electronic devices. Cell phones and particularly iphone® (iphone) are a prime example of that application.

For application in iphone, the touch screen technology has been vastly improved in both the quality and speed of the touch response using capacitive touch sensors. In addition, the iphone touch screen application is designed to detect different type of touches such as, finger swipe, a pinch out and pinch in movement using a thumb and a finger, in addition to touching an icon to activate that icon function.

While recently there has been vast improvement in touch screen user interface technology in handheld electronic devices, there is still a need to further improve the user interface experience in hand held electronic devices.

Hence, it is the objective of the embodiments to have an improved user interface via a touch screen in hand held electronic devices. It is yet another objective to provide touch screen based control in those devices that do not use touch screen.

It is also the objective of the embodiments to have an improved navigation and control function for user interface via a touch screen in hand held devices.

SUMMARY

A user interface via touch screen in handheld devices of the embodiments has a bounded touch screen control surface. The bounded touch screen control surface is exclusively used for controlling the functions of the handheld device in contrast to the prior art touch screens that overlay a touch screen over a display screen and where the touch screen is used for selecting items that are displayed on the underlying display screen.

The touch screen control surface of the embodiments described herein is operable by a thumb tip and is oversized to the size of a thumb tip. For illustration, the size of the control surface could be as ¾ inch by ¾ inch, though it could be a little larger or a little smaller than this size. It could be in a shape that is other than a square depending on the application on the handheld device.

In some aspects, such a touch screen control surface provides the compactness and functionality of existing mechanical control switches that are used for navigation and cursor control via a closely spaced group of switches or a joystick or a roller ball. Such a control surface can be provided as a stand alone control surface that works for hand held devices that may already have an existing touch screen display or it can be provided in those devices that do not have a touch screen display.

In some embodiments, the touch screen control surface may be limited in size to be ½ inch by ½ inch for positioning on a handheld electronic device. In this embodiment, for the purposes of distinguishing touches, the control surface is partitioned into a left and a right area and same surface is also partitioned into overlapping top and bottom areas. These overlapping four areas enable a thumb tip slide movement from the left area to the right area and vice versa and from the top area to the bottom area and vice versa for corresponding navigation and control functions in the handheld electronic device.

The control surface may also have an overlapping center area that overlaps the four areas as above. A quick single or double touch on the center area of the control surface may be used for controlling the functions of the handheld device such as for a mode change control, such as power on/off, and it may also be used for controlling the functions of the handheld device. Such a touch screen control surface obviates the need for mechanical switch controls of the prior art.

The touch screen control surface may be used for (i) a portable music device, (ii) a remote control device for controlling audio/visual devices, and (iii) a game controller where two control surfaces may be positioned on the controller to be simultaneously operated by the thumbs of the two hands. There are other applications and embodiments that are not ruled out. These navigation control functions are achieved without having to use and move a finger tip over the entire touch screen surface of the display screen as in prior art touch screen devices.

In one embodiment, the bounded touch screen control surface, sized to be operated by a thumb tip, is partitioned into nine areas, including one center area and eight surrounding areas. When the thumb tip is placed on any one of these areas and moved in a straight line or in an arc line by a sliding action between different areas of these nine areas, these movements can provide a large number of navigation and control functions.

Not all electronic handheld devices have a display screen, as these handheld devices may only have an output or a controllable function that does not use a display screen. An example of such handheld devices would be small MP3 music players whose output would be audio for both selecting from an audio play list as well as playing the selected music track file. A bounded touch screen control surface may be used for controlling the functions of such a handheld electronic device.

Such a bounded touch screen control surface could replace mechanical control switches in electronic handheld devices for navigation and control. Such a control surface can be easily operated with either hand, while holding the device in that hand, leaving other hand free for other tasks.

The touch control surface of the embodiments, it is believed, provides a compact, versatile, and more effective user interface in handheld electronic devices. These and other features of the embodiments would become clear with the help of the description and accompanying drawings.

BRIEF DESCRIPTION OF THE DRAWINGS

Some of the novel features of the embodiments will be best understood from the accompanying drawings, taken in conjunction with the accompanying description, in which similar reference characters refer to similar parts, and in which:

FIG. 6 is a method diagram that illustrates features of the present embodiments of touch screen control surface.

DESCRIPTION

As illustrated with reference to FIG. 1A, a handheld electronic device such as a music device 15 has a touch screen control surface 14A placed on a part of the electronic device 15, where the control surface 14A is positioned separately from the display screen 12 of the device 15. The touch screen control surface 14A is over-sized to a thumb-tip for operation by a thumb-tip touch action on the control surface 14A.

In a similar embodiment, as illustrated with reference to FIG. 1B, a handheld electronic device 10 such as for personal digital assistants and wireless mobile device has a touch screen control surface 14B placed on a part of the electronic device 10, where again the control surface 14B is positioned separately from the display screen 12 of the device 10. The touch screen control surface 14B is over-sized to a thumb-tip for operation by a thumb-tip touch action on the control surface 14B.

The control surface 14A, 14B is sized 30A and 30B to include one of a size of, an inch by inch, $15/16$ by $15/16$ inch, $7/8 \times 7/8$ inch, $13/16 \times 13/16$ inch, $3/4 \times 3/4$ inch, $11/16 \times 11/16$ inch, $5/8 \times 5/8$ inch, $9/16 \times 9/16$ inch, or $1/2 \times 1/2$ inch. Additionally the control surface in size may be less than or equal to one square inch and greater than or equal to $1/4$ square inch. The shape of the control surface may be other than a square and may be a rectangle depending upon the handheld device application.

Figure 1B:
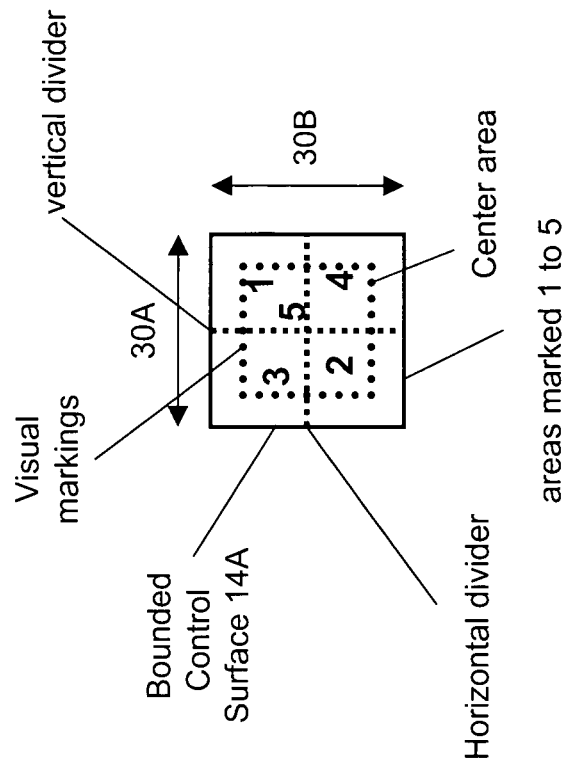
FIG. 1B is a block diagram that illustrates features of an embodiment of a version of touch screen control surface user interface.
Figure 1A:
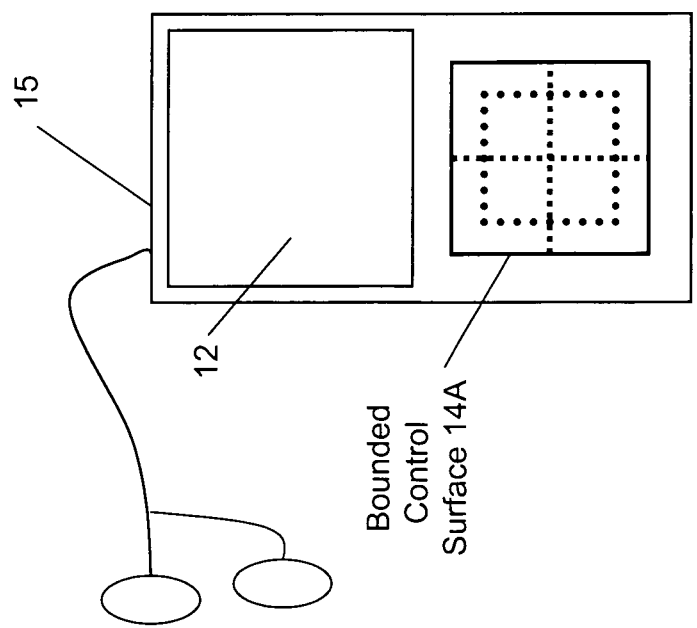
FIG. 1A is a block diagram that illustrates features of an embodiment of a version of touch screen control surface user interface.

As illustrated in FIG. 1A, the control surface 14A has fewer touch areas, such as five overlapping areas, marked as 1, 2, 3, 4 and 5 and thus may be sized on the lower end of the sizes as above, where as the control surface 14B, as illustrated in FIG. 1B has nine touch areas that do not overlap and are marked as 0, 1, 2, 3, 4, 5, 6, 7, and 8 and may be sized at the upper end of the sizes as above. A size of $1/2 \times 1/2$ inch may be preferred for small handheld devices 15 and size of $3/4 \times 3/4$ inch may be preferred for larger handheld devices 10.

The control surface 14A, 14B may be visually partitioned to show the touch areas by lines as in FIGS. 1A and 1B. The visual partition may also use a combination of lines and/or shading. As a simplified illustration, in FIG. 1A, a vertical divider as a dotted line and a horizontal divider as a dotted line in the middle of the control surface 14A demarcate the overlapping top 1 and bottom 2, and the left 3 and right 4 touch areas. A square dotted line box area 5 on surface 14A identifies the overlapping center touch area.

Also as a simplified illustration, in FIG. 1B, two vertical and two horizontal dotted lines on the control surface 14B demarcate the nine touch areas that include a center area 0 and eight surrounding areas labeled 1 to 8. In addition triangle arrows may be shaded on the four touch areas 1, 3, 2 and 4 around the center area 0.

Not all devices are likely to have a display screen such as a very small MP3 music playing and storage device. When the handheld device 10, 15 does have a display screen 12, the touch screen control surface 14A, 14B is positioned on the device separately from the display screen 12.

A touch screen detection logic (not shown) in the handheld electronic device 15, 10 receives touch inputs from the control surface 14A, 14B and provides a user interface for controlling and navigating the functions of the handheld device 15, 10.

The control surface 14A, 14B is placed on the handheld device as a single control surface, operable by a left or right thumb tip, while the device is held in the palm of a left or right hand, and enables navigation control by the thumb tip and operation of the device with one hand alone, as in FIGS. 1A and 1B.

Figure 4:
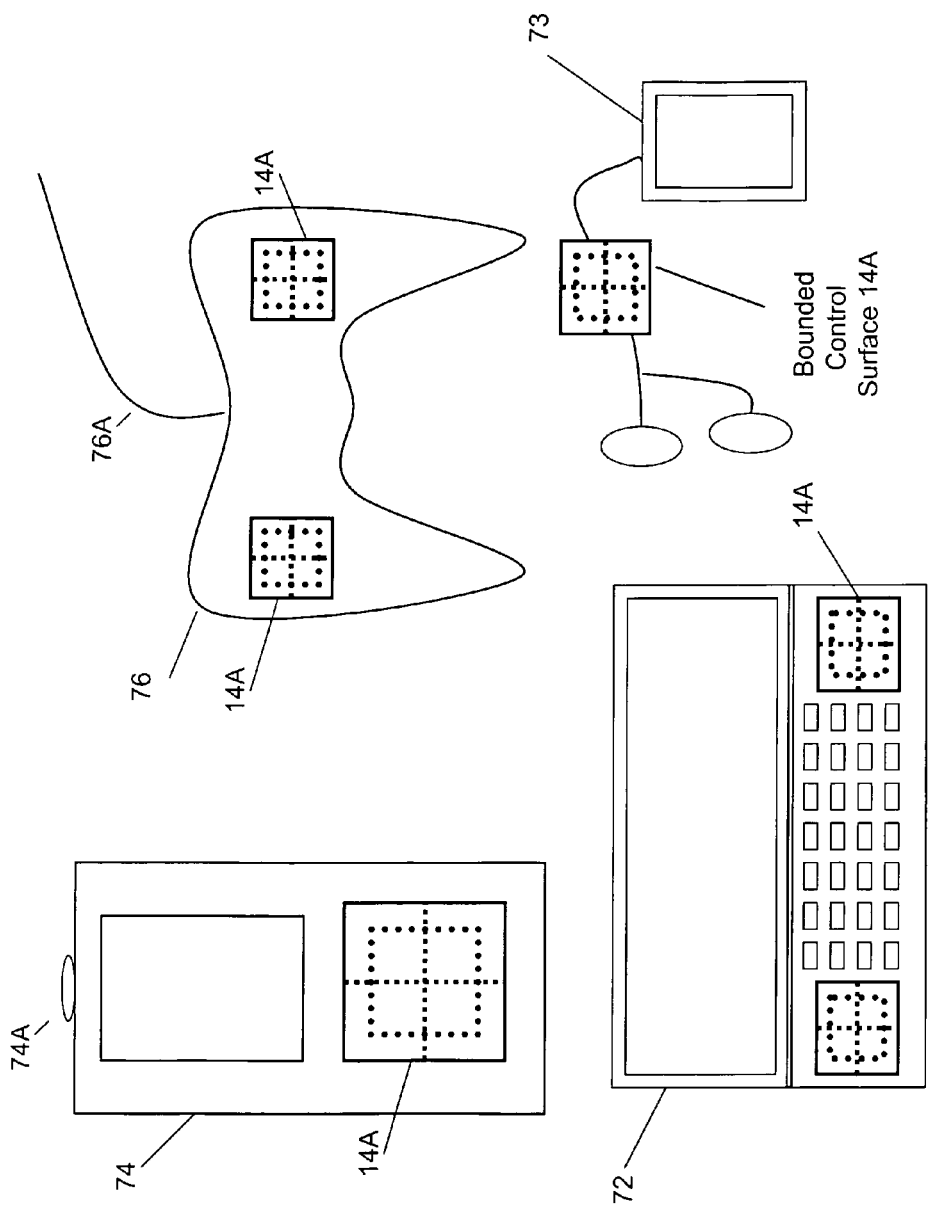
FIG. 4 is a block diagram that illustrates various applications of features of the present embodiments of the different possible touch surface.

Alternatively, as illustrated in FIG. 4, two touch screen control surfaces are positioned on a handheld electronic device, enabling the thumb tips of a left and a right hand to be used for controlling the functions of the device, for handheld device applications 72 and 76.

The touch screen control surface 14A, 14B is partitioned into multiple touch areas for detecting touch inputs. In some applications, there may be at least two touch areas enabling a thumb-tip to slide between these two areas (not shown). In other applications, as illustrated with reference to FIGS. 1A and 1B, there may be multiple overlapping touch areas on the control surface 14A to include, a top area, a bottom area, a left area, and a right area, where a sliding touch action on the areas creates a set of navigation control commands, and a center area, where a touch creates functional mode commands for the handheld device 15.

Figure 2B:
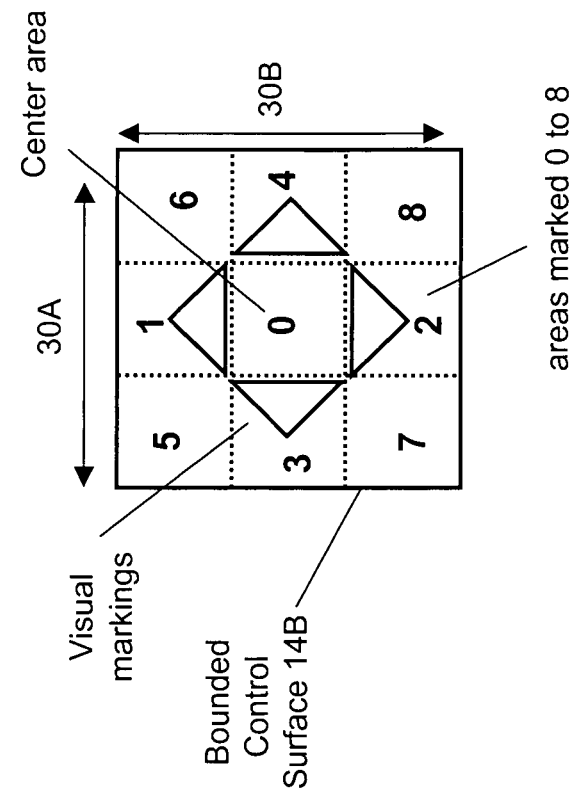
FIG. 2B is a block diagram that illustrates features of an embodiment of a version of touch screen control surface user interface.
Figure 2A:
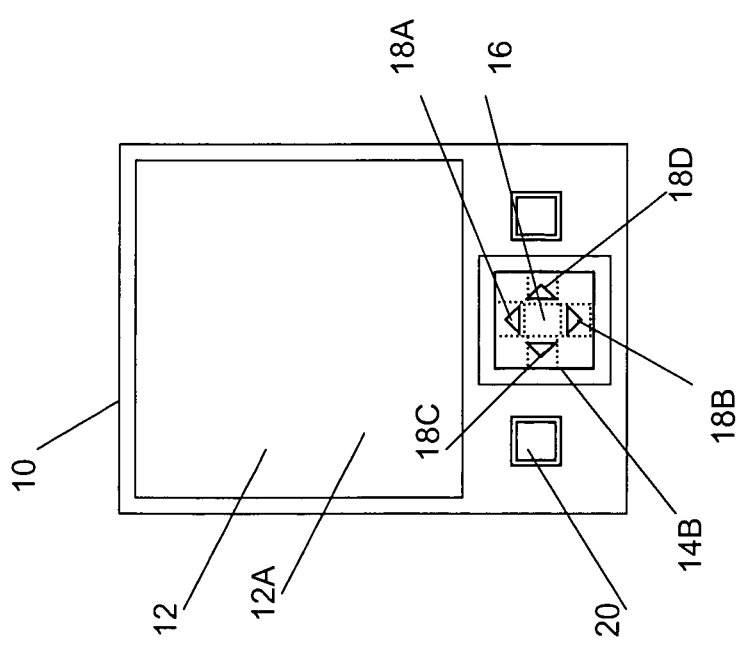
FIG. 2A is a block diagram that illustrates features of an embodiment of a version of touch screen control surface user interface.

As illustrated in FIGS. 2A and 2B, in yet other applications, as in control surface 14B, there may be nine separate touch areas, with a center area and eight surrounding areas, where a sliding thumb-tip movement from any one area to any of the other areas creates a set of unique control command for control and navigation functions.

Control Surface 14A

In one of the embodiments, as illustrated with reference to FIGS. 2A and 1B, a touch screen control surface 14A is limited in size for operation by a thumb tip, and for positioning on a handheld electronic device 15. The control surface 14A is partitioned into a left and a right area. The same area is partitioned into a top and a bottom area that overlaps the left and right areas. These overlapping areas enable a thumb tip slide movement from the left area to the right area and vice versa and from the top area to the bottom area and vice versa for corresponding control functions in the handheld electronic device 15. A quick touch action on the surface 14A anywhere preferably in the center is used for controlling the functions of the handheld device 15.

Hence, as shown in FIG. 2B, the control surface 14A is partitioned into a left area 3 and a right area 4 divided by a vertical divider and an overlapping top area 1 and a bottom area 2 divided by a horizontal divider. These overlapping areas enable a thumb tip slide movement from the left area 3 to the right area 4 and vice versa and from the top area 1 to the bottom area 2 and vice versa for corresponding control functions in the handheld electronic device 15.

A quick touch in the center area 5 may be used for controlling the functions of the handheld device and a quick double touch in the center area may be used for a mode change control, such as power on/off. These touch controls are used for controlling the functions of the handheld device that obviate the need for mechanical switch controls.

In such a touch screen control surface 14A, the surface may be limited in size 30A×30B to be ½ inch by ½ inch for operation by a thumb tip, and for positioning on a handheld electronic device 15. The size may be a little larger and the size 30A×30B is determined by the physical space available on the handheld device 15.

The number of control functions may be less than six functions or more than six functions, as described above, depending upon the functions to be controlled in a handheld electronic device and the control surface itself in the handheld devices may not be a square and may be a shape such as a rectangle. For example, if the control functions required in an electronic handheld device are a, forward/rewind and a play/pause function, that are likely for a music device, then the touch screen control surface is configured to provide such fewer than six control functions.

Therefore, in one embodiment, a user interface for navigation control in a handheld electronic device with a display screen has a touch sensitive control surface on a front part of the handheld device, positioned next to the display screen. The control surface is oversized to a thumb tip. The control surface is partitioned into overlapping a top area, a left area, a right area, and a center area for detecting touch control actions.

The user interface has a touch control logic that may function in cursor control way or menu control way both ways was as described below. In the cursor control way, the control logic imparts continuous movement to a cursor on the display screen when a thumb tip is first positioned on the left area or the right area or the top area or the bottom area is slid to the right area or the left area, or the bottom area or the top area respectively, in a corresponding direction. When the thumb tip is slid back, the logic stops the cursor movement, thereby providing improved user interface of the handheld device, from the control surface alone.

In the menu control way, the control logic creates continuous navigation movements to lateral and hierarchical menus on the display screen when the thumb tip is first positioned on the left area or the right area or the top area or the bottom area is slid to the right area or the left area, or the bottom area or the top area respectively, in a corresponding direction. When the thumb tip is slid back, the logic stops the navigation movement, thereby providing user interface of the handheld device, from the control surface alone.

Also the control logic activates a function when the thumb tip taps the center area, thereby providing ability to control the device, with one hand, when the device is held in the hand. A quick touch for a tap action on the control surface is used for controlling the functions of the handheld device and obviates the need for mechanical switch controls. A quick double touch on the control surface for a mode change control, such as power on/off, is used for controlling the functions of the handheld device that obviate the need for mechanical switch controls.

As illustrated in FIGS. 1A and 1B, a smaller bounded control surface 14A may be used with fewer areas and fewer control functions for handheld music electronic device 15 as well as other applications as described later with reference to FIG. 4 as compared to the embodiment for control surface 14B described with reference to FIGS. 2A and 2B which describe as many as nine control areas that provide a larger number of control actions.

Figure 3A:
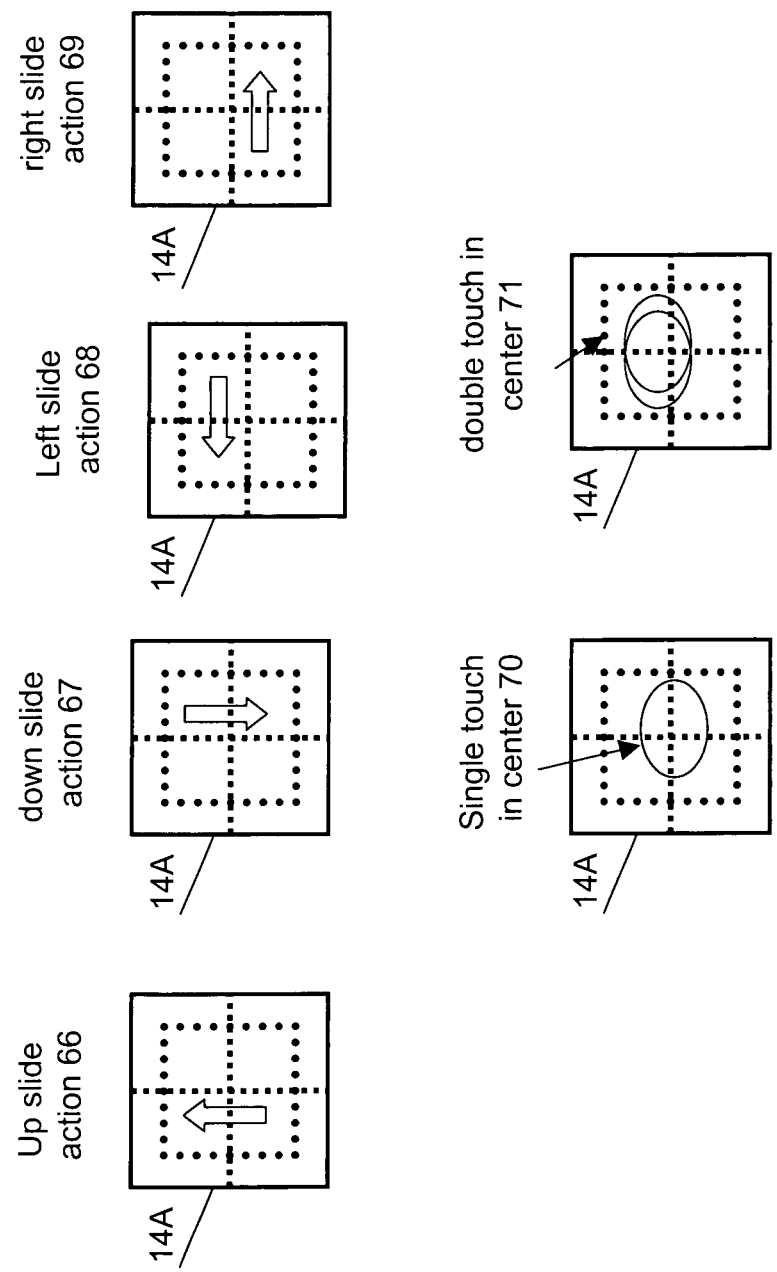
FIG. 3A is a block diagram that illustrates features of the present embodiments of a version of different possible touch surface control movements.

As illustrated in FIG. 3A, the six control functions of the simpler control surface 14A may be achieved by the control surface 14A. These six control actions would be up slide action 66 and down slide action 67 with a thumb tip for up and down cursor or scroll and left slide action 68 and right slide action 69 with a thumb tip for left and right cursor or scroll. A single tap 70 by a thumb tip for item selection and a double touch tap 71 would be used for a mode change such as power on and off. Control logic for these functions is described below.

IF (touch on area 1 or 2 or 3 or 4 at time T detected)
AND THEN
IF (touch on area 2 or 1 or 4 or 3 detected within time delta of T, representing a sliding motion from area 1 to 2 or from 2 to 1, or from 3 to 4 or from 4 to 3)
THEN Issue menu scroll or cursor movement command in that specific direction.
IF (sense touch on center area for time delta T)
THEN Issue activate function command.
IF (sense touch on center area at time T1 and another touch within time delta of T1)
THEN Issue device mode change command.

The control surface may be used in one of the embodiments of (i) a portable music device, (ii) a remote control device for control applications, and (iii) two control surfaces positioned on a game controller, (iv) a general purpose computing device to include a personal digital assistant, a wireless communication device, and a direction finding device. As illustrated in FIG. 1A, and FIG. 4, the control surface 14A may be used in one of the embodiments of (i) a handheld multi-purpose device 72, with a slide or folding screen, (ii) a portable music device 73, without a display screen (iii) a portable music device with a display screen 15, (iv) a remote control device for controlling appliances 74, (v) or two surfaces positioned on a game controller 76. The remote control device 74 may have a wireless remote 74A and another device 76 may have a wired remote 76A.

As in application 72, the control surface 14A may be part of the existing touch screen, if a touch screen is provided (not shown) or it may be a separate touch screen control surface, if the device does not have a touch screen display surface (as shown). Two touch control surfaces 14A on device 72 would facilitate use of both surfaces 14A by the thumb tip of each hand simultaneously, as also in the game controller 76.

In some embodiments, it is not required that the handheld electronic device has a display screen for using the touch screen control surface of the present embodiments, as these handheld devices may only have an output or a controllable function that does not use a display screen. An example of such handheld devices would be music players whose output would be audio for both selecting from an audio play list as well as playing the selected music track file. As in application 73, the control surface 14A may be separate from the device 73 that may be a portable music player, which are small devices without a display screen.

Control Surface 14B

In one embodiment, with reference to FIG. 2A, a bounded touch screen control surface 14B is on a handheld electronic device 10 with a display screen 12 overlaid with a touch screen 12A. The device 10 may also have other control switches 20. The control surface 14B has a center area 16 and four surrounding areas 18A-D within the control surface 14B.

As shown in FIG. 2A, the bounded touch screen control surface 14B may be visually partitioned in a center area 16, a top area 18A, a left area 18C, a right area 18D and a bottom area 18B by lines and shades, making it easy for the user to use the touch screen control surface 14B of this embodiment. As an illustration, the areas 18A-D are visually marked by triangle shape arrows.

Using these five areas on the control surface 14B, one center area 16 and four areas, on top 18A, bottom 18B, left 18C and right 18D, and other remainder four areas of the nine areas of the control surface 14B, a large number of navigation actions and cursor control operations are possible. These are described later in the specification and illustrated with reference to FIG. 3B.

Hence, a user interface for navigation control in a handheld electronic device 10 with a display screen 12, has (a) a touch sensitive control surface 14B on a front part of the handheld device 10, positioned next to the display screen 12. The control surface 14B is oversized sized to a thumb tip and is partitioned into a center area 16, a top area 18A, a left area 18C a right area 18D and a bottom area 18B.

A touch screen control logic creates continuous navigation movements to lateral and hierarchical menus on the display screen 12 when the thumb tip first positioned on the center area 16 of the control surface 14B is slid up or down or slid left or right into the corresponding areas 18A-D, and when the thumb tip is slid back into the center area 16, the logic stops the navigation movement, thereby providing user interface of the handheld device 10, from the control surface 14B alone.

The logic activates a function that is highlighted by a cursor when the thumb tip taps the center area 16, thereby providing ability to control the hand held device 10, with one hand, when the device is held in the hand.

The touch control logic that imparts continuous movement of a cursor on the display screen when a thumb tip first positioned on the center area 16 is slid up or down or slid left or right into the corresponding areas 18A-D, and when the finger tip is slid back into the center area 16, the logic stops the cursor movement provides improved user interface of the handheld device 10, from the control surface 14B alone.

The logic activates scroll navigation function based on thumb tip movement from (i) top area 18A to the bottom area 18B over the center area 16 and vice versa and (ii) from left area 18C to the right area 18D over the center area 16 and vice versa. The control logic may activate other navigation function based on thumb tip circular movement from a right area 18D to a top area 18A and vice versa.

As shown in FIG. 2B, the bounded control surface 14B may be partitioned into nine areas, with a center area identified as area 0 and eight surrounding areas identified as areas 1 to 8. The size of the control surface 14B represented as 30A and 30B and is sized to an oversize of a thumb tip where the thumb tip is positioned on any one of the nine areas and then slid across to other areas to provide a large number of control function through this one touch screen control surface 14B.

As a simplified illustration of the use and operation of the touch screen control surface 14B, as in FIG. 2B, a thumb tip may be positioned on the center area 0 and slid up to area 1 and then slid back to center area 0 to cause a cursor to move up for a time or distance on a display screen. The duration of the time or the distance would be represented by how long the thumb tip touch is maintained on area 1, before sliding it back to the center area. The same would be applicable when the thumb tip is positioned on the center area and slid to areas 2, 3 or 4, for corresponding movements in these three directions of down, left or right. Further, the rate of navigation movement may be set up as a parameter in the control logic.

When the thumb tip is tapped twice on the center area, that is, touched twice with a very short time interval, such a control action on the control surface 14B may be used to select the function that is highlighted by the cursor on the display screen.

The size of the control surface 14B could be 0.75×0.75 inch or it could be a little larger or smaller, depending upon the physical space available on the top of a handheld electronic device. A size such as 30A×30B is suitably sized to place a thumb tip over one of the nine areas of the control surface 14B and slide to other areas of the control surface 14B that would provide a large range of control functions as described in detail later in here with reference to FIG. 3B.

The different navigation functions that are used in the prior art handheld devices with a display screen are moving a cursor on a display screen and when there is a large number of choices to fit on a display screen, scrolling vertically or horizontally a list of items or icons that identify menu choices to select from and that are arranged in a vertical and lateral hierarchical arranged menus.

Hence, a touch-screen control logic described later herein provides many functions that facilitate the use of the control surface 14B for providing a range of control navigation functions. As one example of a navigation control function, the logic creates continuous navigation movements to lateral menus on the display screen when the thumb tip first positioned on the center area is slid left or right into the corresponding other area, and when the thumb tip is slid back into the center area, the logic stops the lateral navigation movement.

As another navigation control function, the touch screen control logic creates continuous navigation movements to hierarchical menus on the display screen when the thumb tip first positioned on the center area is slid up or down into the corresponding other areas, and when the thumb tip is slid back into the center area, the logic stops the navigation movement.

As yet another navigation control function, the touch screen control logic activates a function that is highlighted by a cursor on the screen when the thumb tip taps the center area. Thus the user interface of this embodiment via the control surface 14B alone enables a set of navigation controls in the handheld device 10 as illustrated in FIG. 2B, where these three control functions provide the basic control functions that are inherent in prior art, mouse-like controls for navigation control.

Also, the touch control logic that may impart continuous movement of a cursor on the display screen when a thumb tip first positioned on the center area is slid up or down or slid left or right in that direction. When the thumb tip is slid back into the center area, the logic stops the cursor movement. Thus the user interface via the control surface 14B thereby provides improved user interface of the handheld device, from the control surface 14B alone. Thus, the bounded control surface 14B on the device 10 of this embodiment, with one hand, provides navigation user interface of the handheld device 10, as in FIG. 2B.

Alternatively, the touch control logic does not impart continuous movement of a cursor on the display screen, when a thumb tip first positioned on the center area is slid up or down or slid left or right in that direction and then lifted up, but provides movement that is proportional to the single slide movement of the thumb tip. Alternatively, also the movement of the cursor could be in any direction to match the movement of the thumb tip to resemble a roller ball type movement.

The control surface 14B may be further portioned into four corner areas, where a sliding thumb-tip movement from center area to any of the four corner areas create a set of unique additional control commands that may used for navigation functions. Further, a vertical sliding and horizontal sliding thumb-tip movement from one area to another area over the center area may be used to create a set of scroll navigation control commands. Yet further, a circular arc sliding thumb-tip movement in clockwise and anti-clockwise manner from one touch area to an area that is one over away may be used to create an additional set of unique navigation control commands.

The control surface 14B, operable by a left or right thumb tip, while the handheld device is held in the palm of the left or right hand, enables navigation control by the thumb tip alone and thus operation of the device 10 with one hand alone. The control surface 14B is oversized for a thumb tip enabling the thumb tip to exercise control of the navigation.

Figure 3B:
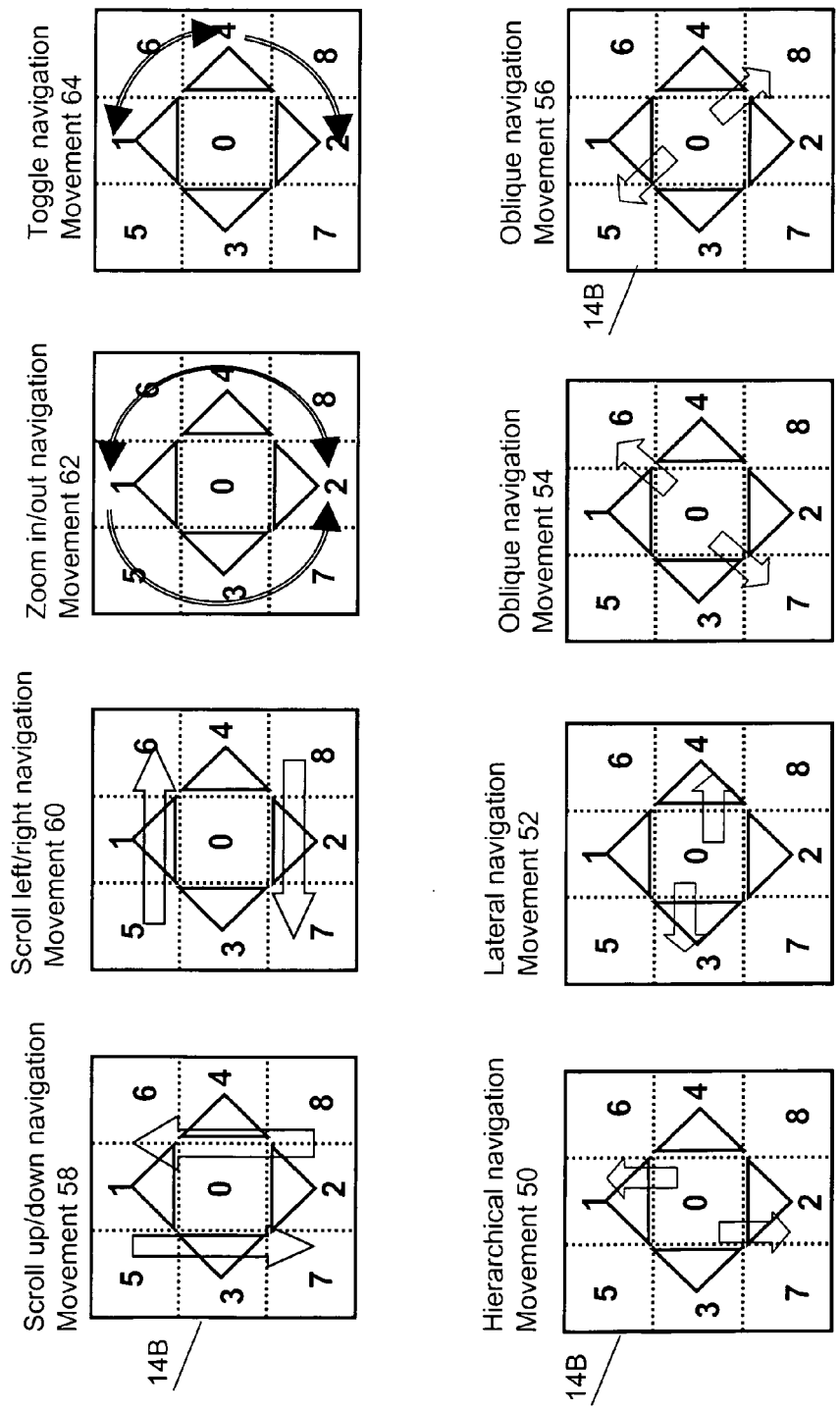
FIG. 3B is a block diagram that illustrates features of the present embodiments of a version of different possible touch surface control movements.

With reference to FIG. 3B, a variety of controls with the help of the touch screen control logic that may be provided are described as follows.

IF (touch on center area 0 at time T detected)
AND THEN
IF (touch on any one of four surrounding areas 1, 2, 3 or 4 detected within time delta of T, representing a sliding motion from area 0 to areas 1, 2, 3 or 4)
THEN
Issue menu scroll or cursor movement command in that specific direction.
THEN
IF (sense touch on center area 0 at time T1)
THEN
Issue scroll/cursor stop movement command
THEN
IF (touch on center area within time delta of T1)
THEN Issue activate function command.

With reference to FIG. 3B, the controls with the help of the touch screen control logic that may be provided are described as follows.

IF (touch on a non-center area of control patch and then touch on center area and a third touch on a non-center area within time T to represent a slide action between these area by the thumb tip) THEN Issue specific control command as follows:
IF (touch area sequence=1, 0 and 2) issue control 1 command
IF (touch area sequence=2, 0 and 1) issue control 2 command
IF (touch area sequence=3, 0 and 4) issue control 3 command
IF (touch area sequence=4, 0 and 3) issue control 4 command
IF (touch area sequence=8, 0 and 5) issue control 5 command
IF (touch area sequence=5, 0 and 8) issue control 6 command
IF (touch area sequence=6, 0 and 7) issue control 7 command
IF (touch area sequence=7, 0 and 6) issue control 8 command
IF (touch on a non-center area of control patch and then touch on another non-center area and a third touch on yet another non-center area within time T to represent a slide action between these area by the thumb tip) THEN Issue specific control command as follows:
IF (touch area sequence=1, 6 and 4) issue control 9 command
IF (touch area sequence=4, 6 and 1) issue control 10 command
IF (touch area sequence=2, 7 and 3) issue control 11 command
IF (touch area sequence=3, 7 and 2) issue control 12 command
IF (touch on a non-center area of control surface and then subsequent touches on four other non-center areas within time T to represent a slide action between this area by the thumb tip) THEN Issue specific control command as follows:
IF (touch area sequence=1, 6, 4, 8, and 2) issue control 13 command
IF (touch area sequence=2, 8, 4, 6, and 1) issue control 14 command Control commands 1 to 14 may represent a range of navigation control functions as illustrated in FIG. 3B, such as hierarchical navigation movement 50, lateral navigation movement 52, oblique navigation movement 54 and 56, scroll up/down navigation movement 58, scroll left/right navigation movement 60, zoom in/out navigation movement 62, and toggle navigation movement 64.

The navigation movement 64 that represent an arc using three of the nine areas may be used in a variety of ways. The navigation movement 62 that represent a semicircle using five of the nine areas may be used for a variety of other navigation control functions. Thus, these fourteen or more different types of touch screen movements on the bounded touch screen control surface 14B provides a large range of navigation and control functions that may be quickly carried out by the thumb tip movements on this relatively small touch control surface 14B in size such as ¾ by ¾ inch.

For the group of nine separate areas as in control surface 14B, a touch control logic, based on inputs from the detection logic, imparts continuous movement of a cursor on the display screen when a thumb tip first positioned on the center area is slid up or down or slid left or right into the corresponding areas, in that direction and when the thumb tip is slid back into the center area, the logic stops the cursor movement, thereby providing improved user interface of the handheld device, from the control surface alone.

For the group of nine separate areas as in control surface 14B, a touch screen control logic based on inputs from the detection logic creates continuous navigation movements to lateral menus on a display screen when the thumb tip first positioned on the center area is slid left or right into the corresponding other area, and when the thumb tip is slid back into the center area, the control logic stops the lateral navigation movement; and the touch screen control logic creates continuous navigation movements to hierarchical menus on the display screen when the thumb tip first positioned on the center area is slid up or down into the corresponding other area, and when the thumb tip is slid back into the center area, the logic stops the navigation movement, thereby the user interface enables navigation in the handheld device from the control surface.

For the group of nine separate areas, as in control surface 14B, the control logic activates a function that is highlighted by a cursor on the display screen when the thumb tip taps the center area, wherein, the control surface on the device with one hand provides navigation user interface of the handheld device.

For the group of nine separate areas, as in control surface 14B, navigation functions may include (i) a vertical sliding and horizontal sliding thumb-tip movement from one area to another area over the center area, create a set of scroll navigation control commands, (ii) a sliding thumb-tip movement from center area to any of the four corner areas create a set of unique control command that may used for navigation functions, and (iii) a circular sliding thumb-tip movement in clockwise and anticlockwise manner from one area to an area one-over creates a set of unique navigation control command.

The control surface 14A and 14B are sized and designed to be operated by a thumb tip. However, they may also be operated by a finger tip. The embodiments 14A and 14B as described above may be manufactured with different features depending upon how the different applications in the market would choose to embed such touch sensor controls in their handheld devices.

Touch Screen Module Device 100

Touch screen technology is prior art. In prior art, the conducting and non-conducting layers that make up the touch screen sensitive surface are placed over a glass substrate that is the display screen of the device. An additional protective layer is placed over the touch sensitive surface layers. Since the underlying display screen must be visible through the touch screen, touch screen layers are designed to transmit light. In the prior art, upward of 90% light is transmitted through the touch screen layers.

However, in the embodiments described here, the touch sensor surface may be placed on a suitable substrate that is not a glass surface of a display screen. Alternatively, it may be a glass surface that may be marked with visual markings that identify different touch areas for touch slide movements as well as names of control functions. Since there is not an underlying display screen providing light, such touch screens may be backlit. Backlighting a screen is prior art technology. An embodiment of how the touch sensor controls may be manufactured is illustrated with reference to FIG. 3.

Figure 5:
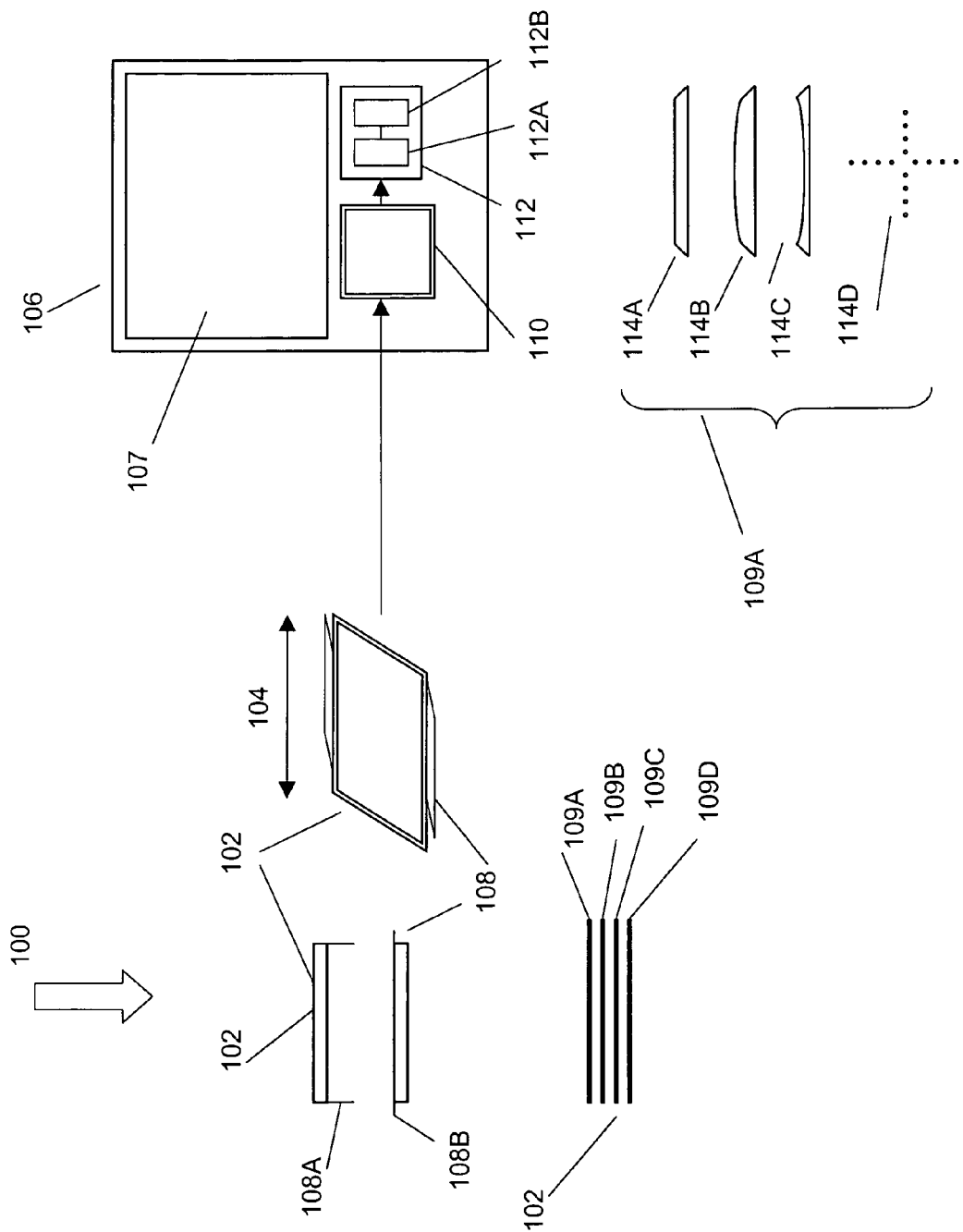
FIG. 5 is a block diagram that illustrates hardware and interface features of the present embodiments.

As illustrated in FIG. 5, a touch sense control device 100 has a capacitive touch sense surface module 102 that is limited in touch surface size 104 to be around in its longest dimension at near one inch or less. The module 102 is used in an application device 106 in a manner where it is not placed over a display screen 107 of the device 106.

The module 102 has electrical interfaces 108 on a periphery of the module 102 that enable the module 102 to be directly attached to a receiving interface socket 110 in the device 106. The interface pins 108 may be in a horizontal configuration 108B or in the vertical configuration 108A relative to the module 102 depending, upon what type of interface socket 110 would be used.

The touch sense control module 102 has a capacitive touch sense surface that with a substrate 109D, a conducting layer 109C, a non-conductive layer 109B, and a protective layer 109A. The touch surface of the module 102 is limited in touch surface size to be in its maximum dimension at near 1.0 inch, where the module 102 is used in a device 106 in a manner where it is not placed over a display screen 107 of the device 106.

A processor 112 embedded in the device 106 receives touch surface inputs from the module 102 via the interface 110 and processes them to identify a one or more control command from the device 100. The processor 112 may have two separate processor functions 112A and 112B. The processor function 112A is for identifying the specific area of the touch surface that has been touched, and processor function 112B may be used to process such touch into touch sensitive control commands, that distinguish between slide actions between different touch areas and touch or tap actions on different touch areas. Alternatively, the module 102 and the processor 112 may be one assembly device 100 that can be manufactured in different sizes for different applications for directly interfacing to the interface socket 110 on handheld device 106.

The module 102 has electrical interfaces on the periphery of the module that enable the module 102 to be directly attached to a receiving interface socket 110 in the device 106.

In one embodiment, the handheld device 106 would have a processor 112 that would receive raw touch surface inputs from the interface 110 and processes them to identify a one or more control commands for the handheld device 106. In another embodiment, the processor 112 would be embedded in the module 102 itself, thus the module device 100 providing one or more standardized control commands to a processor (not shown) that controls the functions of the handheld device 106.

A first processor function 112A embedded in the module receives inputs from the touch surface and processes them to identify a touch location on the touch surface. A second processor function 112B, (i) stores boundary data of multiple touch areas of the control surface (ii) receives touch surface inputs from the first processor function, and (iii) processes them to identify a one or more control command of a touch on a touch area of the surface and a slide between two touch areas of the surface for output from the module 102 to the device 106.

As illustrated in FIG. 5, the protective surface 109A of module 102 may be contoured. Such a contour, it is believed, would facilitate a tactical feel when the thumb tip is used for effecting touch sensitive controls on the control surface 14A, 14B. The contour on protective surface 109A may be in a variety of forms. The examples that are illustrated are a bevel flat surface 114A, a slightly convex surface 114B, a slightly concave surface, and small indentations 114D. These contour examples may be used in any combination that facilitates touch sensitive control by the thumb tip.

As illustrated in FIG. 6, the method steps for touch screen control surface functions are defined below. Not all steps may be used or used in the order specified.

At step 80, bounding a control surface 14B that is oversized to a thumb tip and partitioning the control surface 14B into a center area 16 and four surrounding areas 18A-D.

At step 82, positioning a thumb tip in the center area 16 and sliding on the control surface 14B in any one of four directions causing a corresponding movement of a cursor on the display screen 12, and sliding the thumb tip back to the center area 16 to stop the cursor movement.

At step 84, tapping twice, that is touching twice in a short interval of time, the center area 16 to activate a function that is highlighted by the cursor.

At step 86, further partitioning the control surface 14B into additional four areas situated in the four corners of the control surface 14.

At step 88, positioning the thumb tip in the center area 16 and sliding to any one of four corner areas causing a corresponding movement of a cursor on the display screen, then sliding the thumb tip back, without lifting the thumb tip, to the center area to stop the cursor movement.

At step 90, using the eight areas around the center area 16, creating a set of movements from a group of, (i) up/down, left/right for scroll function (ii) from a right area to a top area and vice versa for an arc movement, (iii) from a top area to a bottom area around the center area, for a semi-circle movement and vice versa.

Similar method steps may be applicable for the embodiment as illustrated with reference to FIG. 1A with fewer touch areas on the control surface 14A.

In summary, the embodiments provide an improved user interface using a touch screen control surface for hand held electronic devices. The embodiments provide an improved user interface using a touch screen control surface for hand held electronic devices that can be used for those devices that currently use touch screen and also for those devices that currently do not use a touch screen display.

While the particular embodiments, as illustrated herein and disclosed in detail is fully capable of obtaining the objective and providing the advantages herein before stated, it is to be understood that they are merely illustrative of the embodiments and that no limitations are intended to the details of construction or design herein shown other than as described in the appended claims.

What is claimed is:

1. A system for using a touch screen for generating control signals for control of an electronic device, comprising:
   a. a touch area of a touch screen that is partitioned into a grid of multiple touch sub-areas in a touch control logic of the touch screen;
   b. a continuous touch movement detection from a single touch on the touch area from a begin sub-area to an end sub-area via a middle sub-area, the continuous touch movement detection in the touch control logic creates substantially an arc touch movement from the begin sub-area to the end sub-area;
   c. the arc touch movement in the touch control logic of the touch screen is used to generate a control command signal for the electronic device.

2. The system as in claim 1, further comprising:
   the continuous touch movement from the begin sub-area to the end sub-area via the middle sub-area, where the continuous touch movement creates substantially a ninety degree arc touch movement in the touch control logic.

3. The system as in claim 2, further comprising:
   the continuous touch movement from the begin sub-area to the end sub-area via the middle sub-area, where the continuous touch movement creates substantially either a convex arc or a concave arc touch movement in the touch control logic.

4. The system as in claim 3, further comprising:
   different touch movement detections either clockwise or anticlockwise and either convex or concave are used to generate different control signals for the device.

5. The method as in claim 1, further comprising:
   a continuous touch movement detection from the begin sub-area to the end sub-area over multiple contiguous middle sub-areas, where the touch movement creates substantially a semi-circle touch movement in the touch control logic.

6. The system as in claim 5, further comprising:
   different semi-circle touch movements, in the touch control logic, either clockwise or anti-clockwise and either convex or concave generate different control signals for the device.

7. The system as in claim 1, further comprising:
   a continuous touch movement detection from the begin sub-area to the end sub-area over multiple contiguous middle sub-areas creates, where the touch movement creates substantially a closed figure touch movement in the touch control logic.

8. The system as in claim 7, further comprising:
   different closed figure touch movements either clockwise or anticlockwise in the touch control logic generate different control signals for the device.

9. The system as in claim 1, further comprising:
   the touch area is positioned on any part of the touch screen.

10. A method of using a touch screen for generating control signals for control of an electronic device, comprising the steps of:
    a. partitioning a contiguous touch area in a touch control logic of the touch screen into a grid of multiple touch sub-areas;
    b. detecting a continuous touch movement from a single touch on the touch area from a begin sub-area to an end sub-area via a middle sub-area, the continuous touch movement creating in the touch control logic substantially an arc touch movement from the begin sub-area to the end sub-area;
    c. using the detected arc touch movement in the touch control logic of the touch screen for generating a control command signal for the device.

11. The method as in claim 10, further comprising the steps of:
    detecting the continuous touch movement from the begin sub-area to the end sub-area via the middle sub-area, where the continuous touch movement creating a substantially ninety degree arc touch movement from the begin sub-area to the end sub-area.

12. The method as in claim 11, further comprising:
    detecting the continuous touch movement from the begin sub-area to the end sub-area via the middle sub-area, the continuous touch movement creating substantially either a convex arc or a concave arc touch movement in the touch control logic.

13. The method as in claim 12, further comprising the steps of:
    detecting different touch movement detections either clockwise or anticlockwise and either convex or concave are used to generate different control signals for the device.

14. The method as in claim 10, further comprising the steps of:
    detecting a continuous touch movement from the begin sub-area to the end sub-area over multiple contiguous middle sub-areas, where the touch movement creates substantially a semi-circle touch movement in the touch control logic.

15. The method as in claim 14, further comprising the steps of:
    detecting different semi-circle touch movements, in the touch control logic, either clockwise or anti-clockwise and either convex or concave generating different control signals for the device.

16. The method as in claim 10, further comprising the steps of:
    detecting a continuous touch movement from the begin sub-area to the end sub-area over multiple contiguous middle sub-areas creating substantially a closed figure touch movement in the touch control logic.

17. The method as in claim 16, further comprising the steps of:
    detecting different closed figure touch movements either clockwise or anticlockwise in the touch control logic, generating different control signals for the device.

18. The method as in claim 10, further comprising the steps of:

positioning the contiguous touch area on any part of the touch screen.

19. A system for using a touch screen for generating control signals for control of an electronic device, comprising:

a. a touch area of a touch screen that is partitioned into a grid of multiple touch sub-areas in a touch control logic of the touch screen;

b. a continuous touch movement detection from a single touch on the touch area from a begin sub-area to an end sub-area, where the continuous touch movement is over one of, (i) three contiguous sub-areas, (ii) four contiguous sub-areas, (iii) five contiguous sub-areas, and (iv) more than five contiguous sub-areas and where the continuous touch movement detection in the touch control logic creates a control command for the electronic device.

20. The system as in claim 19, further comprising:

the touch area is positioned on any part of the touch screen.

* * * * *